March 27, 1951
T. H. LONG
2,546,645
VARIABLE FREQUENCY OSCILLATOR
Filed Aug. 31, 1946
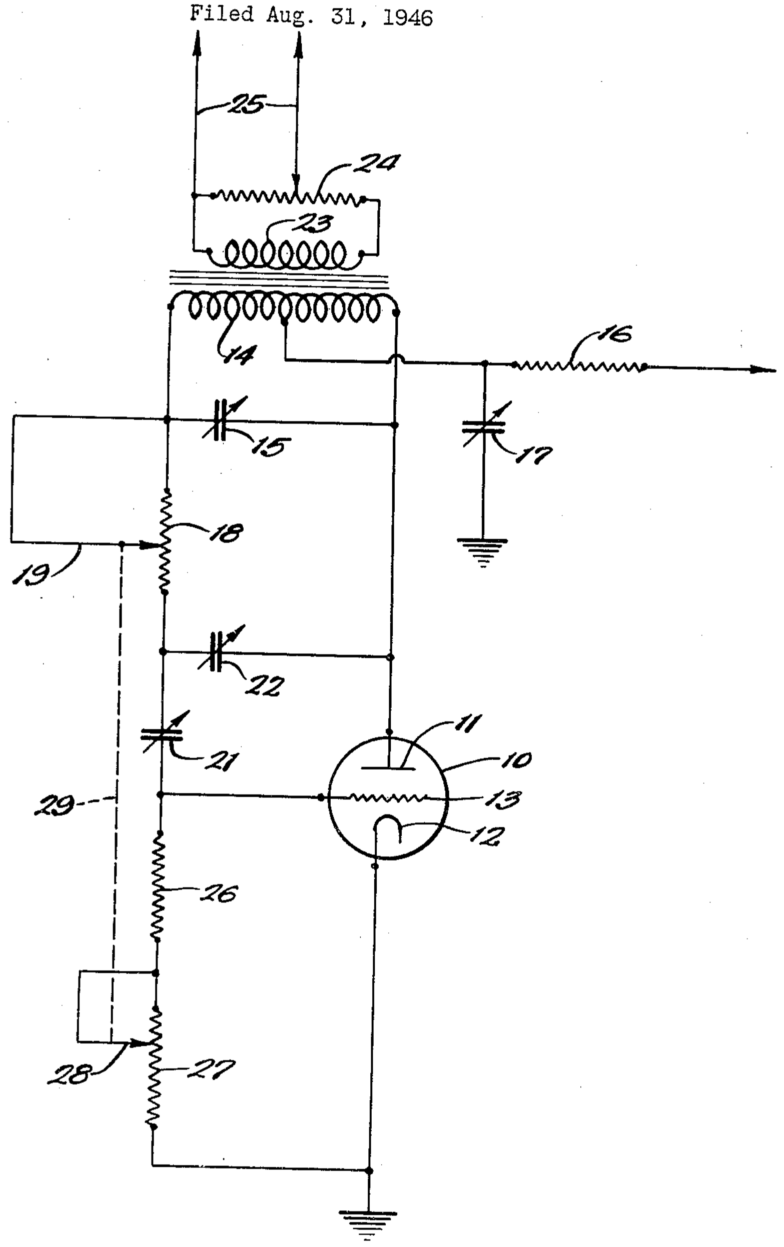
Inventor:
Thomas H. Long,
By Dawson, Booth and Spangenberg,
Attorneys.

Patented Mar. 27, 1951

2,546,645

UNITED STATES PATENT OFFICE 2,546,645

VARIABLE FREQUENCY OSCILLATOR

Thomas H. Long, Elkhart, Ind., assignor to C. G. Conn, Ltd., Elkhart, Ind., a corporation of Indiana Application August 31, 1946, Serial No. 694,383

4 Claims. (Cl. 250—36)

This invention relates to variable frequency oscillators and more particularly to an oscillator operable at a relatively low adjustable frequency for use as a tremolo generator in an electrical musical instrument.

To be satisfactory for use as a tremolo generator, an oscillator should be adjustable within predetermined frequency limits and should maintain a substantially constant voltage output over its entire range. While the limits will vary to some extent with the particular instrument, the frequency should generally be adjustable from about 4½ to about 6 cycles per second, and the voltage variation should be held within about plus or minus 6%.

It is one of the objects of the present invention to provide a variable frequency oscillator which can easily be adjusted to change its frequency, and which provides a substantially constant voltage throughout its range of adjustment.

Another object is to provide an oscillator in which the frequency is adjustable through an infinite number of steps. According to one feature of the invention, the frequency can be changed by adjusting the value of one or more variable resistors in the oscillator circuit.

Still another object is to provide an oscillator which is simple and inexpensive to construct and which presents the operating characteristics required for use as a tremolo generator.

The above and other objects and advantages of the invention will be more readily apparent from the following description when read in connection with the accompanying drawing, in which the single figure is a circuit diagram of an oscillator embodying the invention.

The oscillator circuit, as shown, is essentially a Hartley circuit modified to facilitate frequency adjustment and to maintain the voltage output substantially constant throughout the range. As shown, the circuit comprises an electron discharge tube 10 of the high vacuum type which has an anode 11, a cathode 12, and a control grid 13. The anode 11 is connected to one side of a resonant circuit including an inductive winding 14 and a condenser 15 in parallel. Anode potential is supplied from a suitable source such as a B battery through a resistor 16. Preferably a condenser 17 is connected to the circuit side of the resistor 16 to minimize fluctuations in the anode supply voltage as the oscillator operates.

The other side of the resonant circuit is connected to the control grid through a variable resistor 18 having a wiper 19 movable therealong to change its effective value and through a blocking condenser 21. A reactor shown as a condenser 22 is connected between the anode and a point between the resistor 18 and condenser 21. This condenser cooperates with the resistor 18 to form a phase shift circuit so that as resistor 18 is increased the voltage impressed on the grid lags in phase to reduce the output frequency of the oscillator. The output of the oscillator circuit is through a winding 23 inductively coupled to a winding 14 and supplying a potentiometer resistance 24. Leads 25 tipped in to the resistance may be connected into an electrical organ circuit or the like.

The control grid 13 is also connected to the cathode through a pair of resistors 26 and 27 in series. The resistor 27 is adjustable and, as shown, can be adjusted by moving a wiper 28 therealong. Where a relatively small change in frequency is desired or where a relatively large voltage variation is permissible, the adjustable resistor 27 may be omitted. For example, I have found that a frequency change of from about 4.7 to about 6.1 c. p. s. can be obtained with a voltage fluctuation of less than 6% without requiring the use of an adjustable resistor at 27. Where larger frequency changes are desired or where closer voltage regulation is necessary, the resistor 27 is preferably employed and its wiper 28 is connected to the wiper 19, as indicated by the dotted line 29, for simultaneous adjustment.

With the circuit arranged as shown, frequency changes can be effected simply by adjusting the wiper 19 on the resistor 18. The resistor 18 functions as a phase shift resistor and changes in its value produce corresponding changes in the frequency of oscillation of the circuit. With the circuit arranged as shown, even without the variable resistor 27, I have found that the output voltage varies only to a small extent which is permissible in tremolo generators. When the resistor 27 is used and is adjusted in conjunction with the resistor 18, even better voltage regulation is obtained.

While one embodiment of the invention has been shown and described in detail herein, it will be understood that this is illustrative only and is not intended as a definition of the scope of the invention, reference being had for this purpose to the appended claims.

What is claimed is:

1. A variable frequency oscillator comprising an electron discharge tube having a cathode, an anode and a control grid, a resonant circuit including an inductive winding and a capacitor in parallel connected at one side to the anode, an output winding coupled to the inductive winding, means to supply anode potential to the central part of the inductive winding, a variable resistor connected to the other side of the resonant circuit, a condenser having large capacity relative to the anode-control grid capacity of said tube connected between the anode and the side of the resistor remote from the resonant circuit, and a condenser connecting said remote side of the resistor to the grid.

2. A variable frequency oscillator operable over a range of low frequencies with relatively constant output voltage, comprising in combination, an electron tube having cathode, anode and control electrodes, means defining a circuit between said anode and said control electrode, said means including a resonant circuit, a variable resistance and a capacitor in that order as the path from said anode to said control electrode is traced, a second capacitor connected to said anode and to the junction of said first capacitor and said resistance, and a resistance connected between said control electrode and said cathode.

3. A variable frequency oscillator operable over a range of low frequencies with relatively constant output voltage, comprising in combination, an electron tube having cathode, anode and control electrodes, means defining a circuit between said anode and said control electrode, said means including a resonant circuit, a variable resistance and a capacitor in that order as the path from said anode to said control electrode is traced, a second capacitor connected to said anode and to the junction of said first capacitor and said resistance, and a variable resistance mechanically interconnected with said first variable resistance and electrically connected between said control electrode and said cathode.

4. A variable frequency oscillator comprising an electron discharge device having a cathode, an anode and a control grid, a connection to supply energy to the anode, a resonant circuit connected to the anode, a variable phase shift circuit including two impedance elements in series connected between the resonant circuit and the grid, and a capacitor connected from a point between said impedance elements to said anode.

THOMAS H. LONG.

REFERENCES CITED

The following references are of record in the file of this patent:

UNITED STATES PATENTS

| Number | Name | Date |
|---|---|---|
| Re. 22,834 | Alvira | Jan. 28, 1947 |
| 2,037,659 | Schade | Apr. 14, 1936 |
| 2,100,756 | Shepard | Nov. 30, 1937 |
| 2,216,829 | Plebanski | Oct. 8, 1940 |
| 2,236,985 | Bartelink | Apr. 1, 1941 |
| 2,340,002 | McKellip | Jan. 25, 1944 |

FOREIGN PATENTS

| Number | Country | Date |
|---|---|---|
| 483,918 | Great Britain | Apr. 27, 1938 |